United States Patent [19]

Heath et al.

[11] Patent Number: 5,945,469
[45] Date of Patent: Aug. 31, 1999

[54] NYLON COMPOSITIONS FOR UV STABILITY

[75] Inventors: Richard Bidwell Heath, Morristown; Keith Alan Horn, Long Valley; Allen Franklin Chambers, Jr., South Bound Brook; Lutz Stoeber, Springfield, all of N.J.

[73] Assignee: AlliedSignal Inc., Morris Township, N.J.

[21] Appl. No.: 08/925,924

[22] Filed: Sep. 8, 1997

Related U.S. Application Data

[63] Continuation of application No. 08/642,719, May 3, 1996, abandoned.

[51] Int. Cl.$^6$ ........................................... C08K 5/35
[52] U.S. Cl. ............................. 524/96; 524/100; 524/414
[58] Field of Search ................................ 524/96, 100, 414

[56] References Cited

U.S. PATENT DOCUMENTS

| | | | |
|---|---|---|---|
| 4,761,445 | 8/1988 | Chiba et al. | 524/262 |
| 5,216,103 | 6/1993 | Costanzi | 528/14 |
| 5,380,774 | 1/1995 | Mulholland | 524/102 |
| 5,618,909 | 4/1997 | Lofquist et al. | 528/310 |

FOREIGN PATENT DOCUMENTS

| | | |
|---|---|---|
| 0 430 650 | 6/1991 | European Pat. Off. . |
| 0 480 466 | 4/1992 | European Pat. Off. . |
| 0 581 224 | 2/1994 | European Pat. Off. . |
| 2 640 632 | 6/1990 | France . |
| 94 28053 | 12/1994 | WIPO . |
| WO 94/28054 | 12/1994 | WIPO . |

OTHER PUBLICATIONS

Kurumada, Tomoyuki, et al "Synergism of Hindered Amine Light Stabilizers and UV–Absorbers" Polymer Degradation and Stability, 19 (1987) pp. 263–272.

*Primary Examiner*—Melvyn I. Marquis
*Attorney, Agent, or Firm*—Colleen D. Szuch; Roger H. Criss

[57] ABSTRACT

This invention relates to novel nylon compositions that maintain their appearance on weathering in the presence of U.V. light and a process of their manufacture. These composition are useful in a variety of applications including fibers, molded plastic parts, films and coatings.

49 Claims, No Drawings

NYLON COMPOSITIONS FOR UV STABILITY

This application is a continuation of application Ser. No. 08/642,719 filed May 3, 1996, abandoned.

BACKGROUND OF THE INVENTION

The invention relates to novel nylon compositions, a process for their manufacture and their use as structural and decorative articles that maintain their appearance upon weathering in the presence of UV light.

Ultraviolet light of wavelengths between 280 nm and 400 nm is known to degrade exposed organic matter. Materials used in exterior applications and interior applications (where there is exposure to UV rays through glass) such as fibers and fabrics [for use in applications including marine sails and ropes, awnings, tents, flags, upholstery (including interior automotive fabrics), carpet, sports equipment, soft-sided luggage, seatbelt webbing, animal control webbing and clothing], molded plastic parts [for use in applications including automobile parts (such as mirror housings, door handles, body panels, roof rack components, cowlings, wheel covers, windshield wiper components, window trim parts, and bumpers), as well as, sports equipment, tool housings, lawn equipment housings, lawn mower decks, lawn furniture, furniture components, carriages, baskets and toys], rotationally molded articles [such as tanks, tubes, kayaks, and hollow consumer products], plastic films [for applications including agricultural applications (such as greenhouse coverings, crop protection and food packaging), packaging for chemical products (such as pesticides and fertilizers)], and plastic coatings [for applications including paint] are susceptible to photochemical degradation. Exterior weathering and accelerated weathering simulations also expose plastics to rain, moisture, condensation, and heating/cooling cycles. These conditions are well known to exacerbate the loss of properties of UV exposed plastic materials. A review of the important variables in material weathering can be found in, G. Wypych, "Handbook of Material Weathering", ChemTech Publishing, Toronto, 1995.

Weathered polymers develop undesirable color or haze and subsequently lose their transparency and physical properties such as tensile strength, flexibility, gloss, and impact resistance. Dyed, pigmented, and mineral and glass filled plastics, and textiles (e.g., carpet fibers), and color containing plastics [e.g. aliphatic and aromatic polyamides including nylon 6, nylon 11, nylon 12, nylon 6,12, nylon 6,10, nylon 6,9 and nylon 6,6; polycarbonate; polyesters such as poly(ethyleneterephthalate) (PET) and poly(butyleneterephthalate) (PBT); polyolefins such as poly (ethylene), poly(propylene); aramids; acrylates; acetates; polyvinylchloride; polyimides; fluoropolymers; polyurethanes; polyacetals; polysulfones and polyaryletherketones, as well as copolymer blends (such as impact modified nylon, and PBT/PET] fade, shift in tone, become brittle, lose their elasticity and eventually completely deteriorate.

As a result, the plastics industry has developed a broad range of stabilizers to prevent UV degradation. These include, radical scavengers such as hindered amine light stabilizers (HALS), phosphites and phenolic antioxidants (AOs), thioethers, metal dithiolates, sulfoxides, among others and ultraviolet light absorbers such as benzotriazoles (BZTs), hydroxybenzophenones (HBPs), cinnamates, benzylidene malonates and nickel chelates. A broad review of these and other stabilizers can be found in J. F. Rabek, "Photostabilization of Polymers; Principles and Applications", Elsevier Applied Science, NY, 1990.

U.S. Pat. No. 5,216,103 ('103 patent) to Enichem Synthesis S.p.A. discloses a silicone-based UV stabilizer that may be used with polyamides. The silicone-based stabilizer of Enichem contains a reactive organic group (which may react with the polyamide resin) and a sterically hindered pipiridine (HALS) group. The reactive groups are incorporated into the silicone to render the hindered amines unextractable for uses such as food contact films. The siloxane component of the '103 patent serves essentially as a carrier for the hindered piperidine. By virtue of the chemical attachment of the hindered amine moiety to the siloxane chain it is difficult to independently vary of the content of HALS and siloxane in the material to be stabilized. Thus, in applications where a siloxane material serves a direct role, the composition can not be easily adjusted to obtain optimal performance.

In order to be useful in the stabilization of polyamides, a composition must: abate the degradation of exposed surfaces by radical and other processes; not add objectionable color to the final composition; be nonvolatile under processing and end use conditions; not decompose under processing and end use conditions; not adversely affect the processability of the polyamide [e.g. lubricate an extruder screw, significantly impact the torque of an extruder (either positively or negatively), lessen the throughput of an extruder, or slow the cycle time in injection molding]; not "bloom" excessively in processing or end use (e.g., leave a residue on a mold of an injection molding machine); and must not give off any objectionable odors during processing.

While the prior art describes compositions which may give some intermediate improvements in the weathering stability of polymers, significant improvements are necessary to enable nylon materials to retain their properties and appearances under prolonged exterior weathering.

DESCRIPTION OF THE INVENTION

The novel compositions of this invention comprise: (i) a polyamide resin; (ii) a reactive siloxane; (iii) a hindered amine; and (iv) a phosphite or phosphonite.

Commercially available polyamides may be used in the compositions of this invention. Preferred polyamides are selected from the following classes:

$-NH-(CH_2)_n-CO-$ or $-NH-(CH_2)_n-NH-CO-(CH_2)_m-CO-$ wherein n and m are integers chosen from the set 4, 6, 9, 10, 11 and 12. Many of these materials are commercially available. They may be purchased for example from Allied-Signal Inc. of Morristown, N.J., Toray of Tokyo, Japan, BASF of Ludwigschafen, Germany, Ato Chemie of La Defense, France, or Emser-Chemie AG of Zurich, Switzerland. Alternately, they may be synthesized by using the methods disclosed in U.S. Pat. Nos. 2,071,250; 2,071,251; 2,130,523; 2,130,948; 2,241,322; 2,312,966; 2,512,606; and 3,393,210.

Within the preferred classes of polyamides, the following subclasses are preferred: nylon-6 (polycaprolactam), nylon- 6,6 (polyhexamethylene adiparide), nylon-12 (polydodecanamide), nylon-6, 10 (polyhexamethylene sebacarnide), and nylon-6,12 (polyhexamethylene dodecanamide). Among the compounds within the nylon 6 (polycaprolactam) subclass, the following are preferred: Capron® 8267GHS nylon, Capron 8267G nylon, Capron 8233GHS nylon, Capron 8233G nylon, Capron 8202 nylon, Capron 8202HS nylon, Capron 8202C nylon, Capron 8202CQ nylon, Capron 8351 nylon, Capron 8351HS nylon, Capron 8350 nylon, Capron 8350HS nylon, Capron 8352 nylon, Capron 8352HS nylon, Capron HPN® 9233G nylon, Capron HPN 9233GHS nylon, Capron HPN 9240GM nylon, Capron HPN 9240GMHS nylon, Capron HPN 9333G nylon, Capron HPN 9333GHS nylon, Capron 8330GHIHS nylon, Capron 8331GHIHS nylon, Capron 8333GHI nylon, and Capron 8333GHIHS nylon (products of AlliedSignal Inc.). Of this preferred group, the following compounds are more preferred: Capron 8267GHS nylon, Capron 8267G nylon, Capron 8233GHS nylon, Capron 8233G nylon, Capron 8202 nylon, Capron 8202HS nylon, Capron 8351 nylon, Capron 8351 HS nylon, Capron 8350 nylon, Capron 8350HS nylon, Capron HPN 9240GM, Capron HPN 9240GMHS, Capron HPN 9333G, Capron HPN 9333GHS nylon, Capron 8352 nylon, and Capron 8352HS nylon.

Among the compounds within the nylon-6,6 (polyhexamethylene adipamide) subclass, the following materials are preferred: Ultramid® A3 nylon, A4 nylon, and A5 nylon (products of BASF Corporation) and Zytel® 101 nylon, FE3574 nylon, and FE3071 nylon (products of DuPont). Among the compounds within the nylon-12 (polydodecanamide) subclass, the following material is preferred: Ube 3035C2 nylon (a product of Ube Industries America, Inc.) Among the compounds within the nylon-6,12 (polyhexamethylene dodecanamide) subclass, the following materials are preferred: Ube 7024B nylon, and 7034B nylon (products of Ube Industries America, Inc.), and Grilon® CR9 nylon, and CA6 nylon (products of EMS-American Grilon).

The most preferred polyamide resins within the preferred subclasses of polyamides include: Capron 8267GHS nylon, Capron 8267G nylon, Capron 8233GHS nylon, Capron 8233G nylon, Capron 8202 nylon, Capron 8351 nylon, Capron 8350 nylon, Capron HPN 9240GMHS nylon, Capron HPN 9333GHS nylon, and Capron 8352 nylon. The Capron HS grades of nylon-6 based resin have essentially the same physical properties as the equivalent grades without HS. The only difference between them is that the HS grades are thermally stabilized with from about 50 to about 150 ppm of a copper salt. The polyamide resins are generally used in an amount of from about 30 to about 99 wt. %, preferably from about 40 to about 98 wt. % and most preferably from about 50 to about 98 wt. %.

As used in this application, the term "reactive siloxane" means a siloxane containing at least one organic radical capable of forming a chemical bond with the polyamide resin. These materials are well known in the art. Suitable classes of reactive siloxanes include: siloxanes containing reactive: epoxy groups; primary amine groups; carboxylic acid groups; anhydride groups; isocyanate groups; and mixtures thereof. Many of these materials are commercially available. They may be purchased for example from Gen- esee Polymers Corporation of Flint, Mich., Dow Corning of Midland, Mich., Great Lakes Chemical of West Layfayette, Ind. Alternatively, they may made by adapting the methods disclosed in U.S. Pat. No. 5,216,103 to Enichem Preferred siloxanes containing reactive epoxy groups include those described by structure [1],

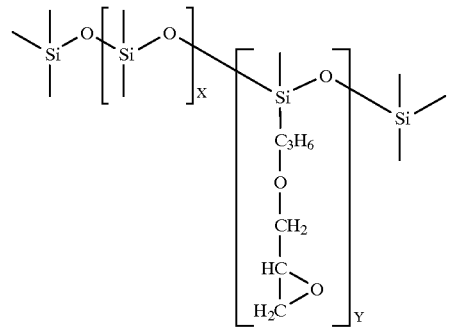

wherein X is between about 75 and about 2000 and Y is between about 1 and about 20. Specific examples include: GP 298 wherein x=670 and y=6, GP 297 wherein x=330 and y=6, and GP Exp32 wherein x =96.5 and y=5.5. These compounds are commercially available from Genessee Polymers.

Preferred siloxanes containing reactive primary amine groups include those described by structure [2],

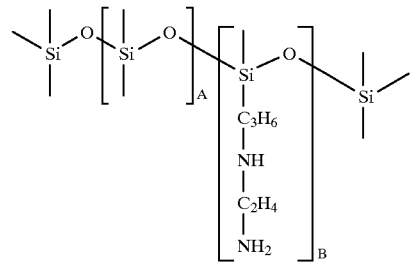

wherein A is between about 75 and about 2000 and B is between about 1 and about 20. A specific example is: GP 316 wherein x=400 and y=8 ( Genessee Polymers).

Preferred siloxanes useful in the invention may also have the structure [3],

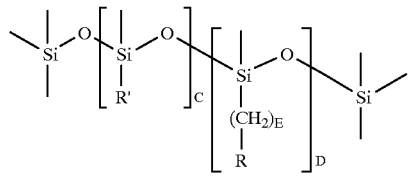

wherein C is between about 75 and about 2000, D is between about 1 and about 20, and E is between about 1 and about 20, $R^1$ is be any substituted or unsubstituted: alkyl [including straight chain, branched chain and cyclic compounds] of from 1 to 25 carbon atoms, aryl [including, but not limited to, phenyl, biphenyl, napthyl, and fluorenyl], hetero aryl [including but not limited to pyridyl, thiophenyl, pyrazinyl, pyridazinyl, and triazinyl, wherein the heteroatom may include but not be limited to oxygen, nitrogen and sulfur] and wherein when $R^1$ is substituted it is substituted with any of the following: cyano, alkoxy, halogen (including fluorine, chlorine and bromine), partially or fully halogenated alkyl or aryl (including, but not limited to, trifluoromethyl, 4-fluorophenyl, 4-trifluoromethylphenyl, and 1,1,1-trichloro ethyl), phenyl, substituted phenyl, alkyl, substituted alkyl, and silyl (including but not limited to trimethyl silyl) wherein when these groups are substituted they are substituted with any of the groups from which $R^1$ may be selected, and R is an isocyanate, anhydride, carboxylic acid, amine, or epoxy group. Other siloxanes which may be useful in this invention include Dow Corning 4-7051 Epoxy Resin Modifier, and Dow Corning 1-9641 Amine Resin Modifier.

The more preferred siloxanes for use in this invention are those of structure [1] wherein X is between about 300 and about 1500 and Y is between about 5 and about 15, those of structure [2] wherein A is between about 300 and about 1500 and B is between about 5 and about 15, and those of structure [3] wherein C is between about 300 and about 1500, D is between about 5 and about 15, E is between about 3 and about 8, and R and $R^1$ are any of the groups listed in the discussion of these respective groups in structure [3] above. The most preferred siloxanes for use in this invention are those of structure [1] wherein X is between about 300 and about 1000, and Y is between about 5 and about 10 specifically including GP-298 and GP-297, and those of structure [2] wherein A is between about 600 and about 1500, and B is between about 5 and about 10.

Two or more reactive siloxanes may be used in combination in the present invention provided that they are not present in excess of the loading set forth below. The reactive siloxanes are generally used in an amount of from about 0.5 to about 10 wt. %, preferably from about 1 to about 6 wt. % and most preferably from about 2 to about 4 wt. %. Applicants have discovered that the best results are obtained when the siloxane component is present in greater than 2.4 wt. %. See Table 2, Example 2, samples 11 and 12.

Any hindered amine which processes under standard polyamide processing conditions with less than 10% loss through volatilization or decomposition (as determined by extraction and chromatographic analysis of extractable additives), and which does not chemically react with the composition or any of its essential components may be used in the compositions of the invention. Many of these materials are commercially available. They may be purchased for example from Ciba-Geigy Corporation of Ardsley, N.Y., Cytec Corporation of Stamford, Conn., Ferro-Bedford Chemicals Inc. of Walton Hills, Ohio, BASF Corporation of Clifton, N.J., Clariant Corporation of Charlotte, N.C., and Great Lakes Chemical of West Layfayette, Ind. A list of available HALS compounds and suppliers can be found in J. F. Rabek, "Photostabilization of Polymers; Principles and Applications", Elsevier Applied Science, NY, 1990.

The following hindered amines are preferred: Chimassorb™ 119 hindered amine {N,N'''-[1,2-Ethanediylbis[[[4,6-bis[butyl(1,2,2,6,6-pentamethyl-4-piperidinyl)amino]-1,3,5-triazin-2-yl]imino]-3,1-propanediyl]]bis [N'N''-dibutyl-N',N''-bis(1,2,2,6,6-pentamethyl-4-piperidinyl)]-1,3,5-triazine-2,4-6-triamine}, Chimassorb 944FL hindered amine {N,N''-bis(2,2,6,6-tetramethyl-4-piperidinyl)-1,6-hexanediamine, polymer with 2,4,6-trichloro-1,3,5-triazine and 2,4,4-trimethyl-1,2pentamine}, Tinuvin® 144 hindered amine {Bis(1,2,2,6,6-pentamethyl-4-piperidinyl)(3,5-di-tert-butyl-4-hydroxyl)butylpropanedioate)},Tinuvin 622 hindered amine {Dimethyl succinate polymer with 4-hydroxy-2,2,6,6-tetramethyl-1-piperidineethanol}, Tinuvin 765 hindered amine {Bis(1,2,2,6,6-pentamethyl-4-piperidinyl) sebacate) and Tinuvin 770 hindered amine {Bis(2,2,6,6-Tetramethyl-4-piperidinyl)sebacate} all products of Ciba-Geigy Corporation, Cyasorb® TV-3346 hindered amine {Poly[(6-morpholino-s-triazine-2,4-diyl)[2,2,6,6-Tetramethyl-4-piperidylimino]-hexamethylene [(2,2,6,6-tetramethyl-4-piperidyl-imino]]} a product of Cytec Corporation, UV-Check® AM806 hindered amine {2,2,6,6-Tetramethylpiperide-4yl-acrylate, methylmethacrylate copolymer} a product of Ferro-Bedford Chemicals Inc., Uvinul® 4050H hindered amine (Formamide, N, N'-1,6-hexanediylbis{N-(2,2,6,6-tetramethyl-4-piperidinyl)}, and Uvinul 5050OH hindered amine a polymer of about 3000 to about 4000 molecular weight having the structure:

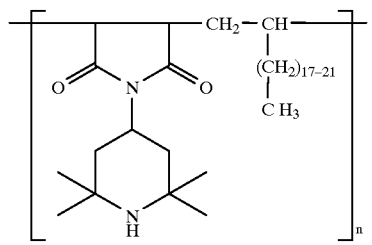

wherein n is about 5 to about 9, both products of BASF Corporation. The most preferred hindered amine compounds are: Cyasorb 3346 hindered amine, UV-Check AM 806 hindered amine, Uvinul 5050 hindered amine, Tinuvin 944 hindered amine, Tinuvin 144 hindered amine, and Tinuvin 622 hindered amine. It is possible that the combination of two or more hindered amine compounds (not to exceed the loadings given below) may provide enhanced performance. Although the hindered amine component of the invention includes compounds in which a hindered amine moiety is bonded to a siloxane, as per U.S. Pat. No. 5,216,103 to Enichem, such compounds are not preferred.

The hindered amines are generally used in an amount of from about 0.1 to about 4 wt. %, preferably from about 0.25 to about 3 wt. % and most preferably from about 0.25 to about 1.5 wt. %.

Any phosphite or phosphonite which processes under standard polyamide processing conditions with less than 10% loss through volatilization or decomposition (as determined by extraction and chromatographic analysis of extractable additives), and which does not chemically react with the composition or any of its essential components may be used in the compositions of the invention.

Preferred compounds include: inorganic phosphites such as: sodium hypophosphite, potassium hypophosphite, magnesium hypophosphite, calcium hypophosphite, and ammonium hypophosphite, organic phosphites such as: Irgaphos® 12 phosphite 2-[[2,4,8,10-Tetrakis(1,1-dimethylethyl) dibenzo[d,f][1,3,2]dioxaphosphepin-6-yl]oxy]-N,N-bis[2-[[2,4,8,10-tetrakis(1,1-dimethylethyl)dibenzo[d.f][1,3,2] dioxaphosphepin-6-yl]oxy]ethyl]ethanamine}, Irgaphos168 phosphite {tris(2,4-di-tert-butylphenyl)phosphite} (products of Ciba-Geigy Corporation of Ardsley, N.Y.), Ultranox® 626 phosphite, {bis(2,4-di-tert-butylphenyl) pentaerythritol diphosphite}, Weston® 618 phosphite {distearyl pentaerythritol diphosphite} (products of General Electric Specialty Chemicals of Pittsfield, Mass.) and those materials disclosed in U.K. Patent 803,557, and U.S. Pat. No. 3,516,963 which are incorporated by reference, organic phosphonites such as: Sandostab® P-EPQ phosphonite, {tetrakis(2,4-di-tert-butylphenyl)4,4'-diphenylenediphosphonite} (a product of Sandoz Chemicals Corporation of Charlotte, N.C.), Ethanox® 398 phosphonite {2,2'-ethilidinebis(4,6-di-tert-butyl-m-phenyl)fluorophosphonite} (a product of Albemarle Corporation of Baton Rouge, La.) and those described in patent BE-A-774,363 to Sandoz which is incorporated by reference, and the fluorophosphorus compounds described in U.S. Pat. No. 4,912,155 to Burton which is incorporated by reference.

The preferred phosphorous-containing compounds include: sodium hyposhosphite, Sandostab P-EPQ phosphonite, Ethanox 398 phosphonite, Irgaphos 12 phosphite, and Irgaphos 168 phosphete. The most preferred phosphorus compounds include: sodium hypophosphite, Sandostab P-EPQ phosphonite, and Irgaphos 12 phosphite. The phosphite and phosphonite compounds are generally present in the subject invention in an amount of from about 0.05 to about 2 wt. %, preferably from about 0.05 to about 1 wt. % and most preferably from about 0.05 to about 0.25 wt. %.

The compositions of the invention may also include other additives known to be useful in polyamide compositions, such as flame retardants, lubricating agents, release agents, impact modifiers, plasticizers, and colorants.

A detailed description of suitable impact modifiers for polyamide-based compositions and their preparation is provided in the U.S. Pat. No. 4,174,358 to E. I. Du Pont de Nemours and Company and the references cited therein which are incorporated herein. The amount and identity of modifier used in the compositions of the invention is application dependent. The selection will readily occur to those skilled in the art. Generally the modifiers comprise no more than 50% by weight of the polyamide resin. Preferably, the modifiers comprise from about 5 to about 30%, and most preferably from about 15 to about 30% of the total weight of the composition.

Essentially any filler material known to be useful in polyamide-based formulations may be used in the compositions of the invention. Suitable fillers include talc, clay, mica, silica, calcium silicate, graphite, alumina, and potassium carbonate of varying particle sizes. The size and variety of filler chosen is application dependent. The specific selection will readily occur to one skilled in the art. The filling agents may comprise up to 60% by weight of the composition. Preferably, they are used in an amount of from about 10 to about 60%, and most preferably in an amount of from about 10 to about 40% by weight of the composition.

Any reinforcing agent known to be useful in polyamide-based formulations may be used in the compositions of the invention. Suitable reinforcing agents include glass fibers, graphite fibers, other carbon fibers, glass flakes, ceramic fibers, fibers of synthetic polymers and other materials obvious to those well versed in the art. The reinforcing agents and fillers may be treated with bonding agents to insure adequate adhesion to the polymer matrix. The reinforcing agents may be present in an amount of from about 5 to about 60% by weight of the composition. Preferably the reinforcing agents are used at loadings of from about 15 to about 40% by weight of the composition (provided that any combination of reinforcing and filling agents does not exceed 60% by weight of the composition).

Suitable colorants for use in the present invention are carbon blacks, inorganic pigments, organic pigments and dyes. Preferred carbon blacks are UV grade blacks defined as carbon black with an absorption coefficient (ASTM D3349-74) of greater than 400, dispersed in a suitable carrier; specific examples are SWBK-411A (a product of Southwest Chemical of Houston, Tex.), 690345-NY (a product of Ampacet Corporation of Terrytown, N.Y.) and 7932-A1 (a product of Americhem of Cuyahoga, Ohio). The most preferred carbon blacks are highly dispersed UV grade carbon blacks in a nylon or EVA carrier. A specific example is SWBK-411a. The degree of dispersion of a carbon black is measured by comparing a standard tape or blown film with a set of reference standards compiled by various suppliers. Alternatively, the quality of dispersion can be observed directly on a thin film under a microscope at 100× magnification. Observation of the size and frequency of aggregates determines the quality of dispersion with fewer and smaller aggregates indicating greater dispersion. Those individuals skilled in the art can readily classify the degree of dispersion by comparing samples to suitable control specimens.

Preferred inorganic pigments are those that do not contain heavy metals such as cadmium, mercury or lead. Specific examples include 2GTM bismuth vanadate yellow [CAS #14059-33-7] (a product of Ciba-Geigy Corporation of Newport, Del.), red iron oxide pigment [CAS # 1309-37-1] (a product of Pfizer Inc. of New York, N.Y.), and cerium sulfide red and orange (products of Rhone-Polenc Inc. of Dayton, Ohio). Preferred organic pigments are those that are stable to common polyamide processing conditions, and are stable to UV light. Specific examples are phalocyanine blue P.B. 15-4 (a product of Sun Chemical Corporation of Cincinnati, Ohio), phtalocyanine green P.G. #7 (a product of Hoechst-Celanese Colorants of Coventry, R.I.), and magenta pigment red 202 quinacridone CI #73907 (a product of Ciba-Geigy Corporation of Newport, Del.).

Preferred dyes are those that are stable to common polyamide processing conditions and are stable to UV light. Specific examples are filamid red GR solvent, red 225 (a product of Ciba-Geigy Corporation of Newport, Del.), and Macrolex Red E2G, solvent Red 179 (a product of Bayer Corp. of Pittsburgh, Pa.).

Colorants are generally used in combinations to obtain a desired color. The process of mixing the colorants is well known to those skilled in the art. The colorants used in the present invention are generally present in an amount of from about 0.5 to about 5 wt. %, preferably from about 1 to about 3.5 wt. % and most preferably from about 1.5 to about 3 wt. %.

Applicants have unexpectedly discovered that when a highly dispersed carbon black is added to the compositions of the invention the color change after weathering is greatly diminished. In fact, of all of the compositions tested this embodiment produces the least change in color. See Table 2, Example 2, samples 12–14.

Suitable other commercially available stabilizers with which the novel composition of the invention may be combined include, phenolic antioxidants (AOs), thioethers, metal dithiolates, sulfoxides, among others and ultraviolet light absorbers such as benzotriazoles (BZTs), hydroxybenzophenones (HBPs), cinnamates, benzylidene malonates, nickel chelates, oxanilides, copper-based heat stabilizers and combinations and permutations thereof Any combination that creates significant color changes, or does not result in an improvement in color or gloss retention relative to a composition excluding the additional additive would of course be avoided. Other stabilizers which can be used in combination with the novel compositions of the invention can be found in the book by J. F. Rabek, "Photostabilization of Polymers; Principles and Applications", Elsevier Applied Science, NY, 1990.

The compositions of this invention may be prepared by any method well known in the art. Preferred methods are disclosed in the examples which follow.

EXAMPLES

The compositions used in the Examples which follow were prepared by adding to a dry blend of base resin, a siloxane or siloxane master batch, a hindered amine, a phosphite or phosphonite, and any other additives through an upstream feeder on a W&P 40 mm twin screw extruder. The bulk of the base resin was added down the extruder throat and filling and reinforcing agents were added down stream. The extruder was run with a temperature profile of 250, 250, 260, 260, 260, 260, 260, 260, 260, 280 (all in ° C.) at 400 RPM and full vacuum. The extrudate was chipped and dried. Masterbatches were prepared using essentially the same procedure. The final compounded chips were molded into standard 2½"×6"×¼" 20 gloss plaques using a 15 ton Cincinnati molding machine using temperatures of rear: 520°, center 540°, front 560°, nozzle 580°, and mold 250° (all in Fahrenheit), pressures of: 1100 injection, 600 hold, and 50 back (all in psi), and times of: injection 8 seconds, forward 10 seconds, and closed 15 seconds.

The plaques formed served as test specimens to evaluate the effect of weathering on appearance. The color shift and gloss of the specimens were measured after weathering in an Atlas CI-65A Xenon Arc Weatherometer in accordance with AE J-1960. Some samples were weathered using SAE J-1960 at an industry approved independent testing laboratory, and these samples are labeled accordingly. The length of exposure for each sample is expressed as the total length of the test in hours, and the total irradiance dose is expressed in kilojoules per square meter ($kJ/m^2$). The color shift of the samples was measured in a color spectrophotometer in accordance with ASTM D-2244. The results are reported as ΔE relative to the initial color of the samples. The samples were also measured for gloss in accordance with ASTM 523. When samples were weathered at an independent laboratory, that laboratory also performed the color shift and gloss measurements. The results are presented in the tables which follow. The amount of each component present in the compositions is expressed in wt. % of the total composition. When copper salts are used, they are expressed in terms of copper content.

Example 1

A variety of stabilizers were evaluated in glass and mineral filled nylon-6. The compositions were prepared according to the process described above. The GP-298 siloxane material was added as a 5% masterbatch in unfilled nylon-6. Weathering and final measurement of the color shift and gloss of the samples was performed by an independent testing laboratory. The color shift and gloss retention results are the averages of two samples.

TABLE 1

Color Shift and Gloss Retention of Samples Weathered for 1000 hours (1316 $kJ/m^2$) at an Independent Testing Laboratory According to SAE J-1960.

| Sample | A | 1 | 2 | 3 | 4 |
|---|---|---|---|---|---|
| Nylon (Capron ® 8267G)[1] | 98.49 | 98.09 | 97.49 | 97.89 | 95.21 |
| CuI/KI | 0.01 | 0.01 | 0.01 | 0.01 | 0.01 |
| Irgaphos 168 | | 0.2 | | | |
| Irganox ® 1010[2] | | 0.2 | | | |
| Cyasorb 3346 | | | 1.0 | 0.5 | 0.5 |
| Sodium Hypophosphite | | | | 0.1 | 0.1 |
| GP-298 Siloxane | | | | | 2.68 |
| BK6304-6B[3] | 1.5 | 1.5 | 1.5 | 1.5 | 1.5 |
| ΔE | 3.9 | 3.2 | 2.6 | 3.3 | 0.6 |
| Gloss | 6.7 | 7.4 | 7.4 | 7.4 | 9.7 |

[1]Capron 8267 nylon is a 40% glass and mineral filled nylon 6 polymer with ultimate elongation of 4% (ASTM D-638), notched Izod of 0.9 ft.-lbs./in (ASTM D-256), and a flexural modulus of 1,110,000 psi (ASTM D-790).
[2]Irganox ® 1010 anti-oxidant is a product of the Ciba-Geigy Corporation.
[3]BK6304-6B (a UV black colorant concentrate) is a product of Americhem.

The data of Table 1 clearly show the dramatic and unexpected improvement in resistance to color shift of the compositions of the present invention. Samples 1 and 2 represent compositions which those skilled in the art would reasonably expect to give improvements in light stability relative to control (sample A). A comparison of the performance of samples 2 and 3 with that of sample 4 demonstrates the unexpected synergy achieved through the combination of a nylon base resin, a reactive siloxane, a hindered amine and a phosphite or phosphonite.

Example 2

Variations of the composition of the invention in a glass and mineral filled nylon-6 were evaluated in an effort to demonstrate the reproducibility of performance of the invention. The compositions were made according to the process described above. The GP-298 siloxane material was added as a 5% masterbatch in unfilled nylon-6. Weathering and final measurement of the color shift and gloss of the samples were performed by an independent testing laboratory. The color shift and gloss retention results are the averages of two samples.

TABLE 2

Color Shift and Gloss Retention of Samples Weathered for 1000 hours (1316 kJ/m$^2$) at an Independent Testing Lab using SAE J-1960.

| Sample | B | 5 | 6 | 7 | 8 | 9 | 10 | 11 | 12 | 13 | 14 |
|---|---|---|---|---|---|---|---|---|---|---|---|
| Nylon (Capron 8267G) | 98.34 | 98.34 | 97.99 | 97.99 | 96.99 | 97.34 | 94.01 | 96.07 | 94.96 | 94.96 | 95.11 |
| CuI/KI | 0.01 | | | | 0.01 | 0.01 | 0.01 | 0.01 | 0.01 | 0.01 | 0.01 |
| CuI/LiI | | 0.01 | 0.01 | 0.01 | | | | | | | |
| Tinuvin 770[4] | | | | | 1.0 | | | | | | |
| UV Check AM-806 | | | | | | | 0.5 | | | | |
| Cyasorb 3346 | | | | | | 1.0 | | 0.5 | 0.5 | 0.5 | 0.5 |
| Sodium Hypophosphite | | | | | | | 0.1 | 0.1 | 0.1 | 0.1 | 0.1 |
| UV Check AM-340[5] | | | | | | | 0.5 | | | | |
| Tinuvin 234[4] | | | | | | | 0.5 | | | | |
| GP-298 Siloxane | | | | | | | 2.38 | 1.32 | 2.43 | 2.43 | 2.63 |
| 690345NY[6] | | | 2.0 | | 2.0 | | 2.0 | 2.0 | 2.0 | | |
| 7932-A1[7] | | | | 2.0 | | | | | | 2.0 | |
| BK-411A SW[8] | 1.65 | 1.65 | | | | 1.65 | 1.65 | | | | 1.65 |
| ΔE | 2.4 | 2.4 | 3.6 | 3.0 | 3.8 | 2.8 | 2.7 | 2.5 | 1.2 | 1.6 | 0.3 |
| Gloss | 9.1 | 8.8 | 7.3 | 7.0 | 7.6 | 8.6 | 10.0 | 8.4 | 10.0 | 9.6 | 10.2 |

[4]Tinuvin 770 hindered amine, and Tinuvin 234 benzotriazole are products of Ciba-Geigy Corporation.
[5]UV Check AM-340 benzoate is a product of Ferro-Bedford Chemicals.
[6]BK690345NY (a UV black colorant concentrate( is a 25% 9A32 black in a nylon-6 carrier. It is a product of Ampacet.
[7]7932-A1 (a UV black colorant concentrate) is a 25% 9A32 black in a nylon-6 carrier. It is a product of Americhem.
[8]BK-411A SW (a UV black colorant concentrate) is a 42% 9A32 black in an EVA carrier with a melt index (@ 190° C., 21.6 kg) 16–30 gms/10 min. (ASTM D1238) and a pellet weight of 1.8–2.6 g/100 pellets. Southwest has given this concentrate a dispersion rating of D at a 15.8; 1 let down in the film evaluation described previously. It is a product of Southwest Chemical.

A comparison of samples 12, 13, and 14 with control sample B demonstrates that the beneficial effects of this invention can be realized in a variety of carbon black pigments, but that the effect is most pronounced when a highly dispersed carbon black is used.

Example 3

The compositions of Table 3 are made using the process described above. The amount of each component present in each composition is reported in the table as wt. % with the balance of the compositions made up of the nylon component.

TABLE 3

| Sample | Nylon | Siloxane | HALS | Phosphorus Compound | Colorant | Anti-Oxidant | Other |
|---|---|---|---|---|---|---|---|
| 15 | Capron 8202[9] | GP-298 (2.6) | CY 3346 (0.5) | SHP (0.1) | BK-411A (2.0) | | |
| 16 | Capron 8202 HS[10] | GP-298 (2.6) | CY 3346 (0.5) | SHP (0.1) | BK-411A (2.0) | | |
| 17 | Capron 8233G[11] | GP-298 (2.6) | CY 3346 (0.5) | SHP (0.1) | BK-411A (2.0) | | |
| 18 | Capron 8267G[12] | GP-298 (2.6) | CY 3346 (0.5) | SHP (0.1) | BK-411A (2.0) | | |
| 19 | Capron 8351[13] | GP-298 (2.6) | CY 3346 (0.5) | SHP (0.1) | BK-411A (2.0) | | |
| 20 | Capron 8352[14] | GP-298 (2.6) | CY 3346 (0.5) | SHP (0.1) | BK-411A (2.0) | | |
| 21 | Capron HPN9233G[15] | GP-298 (2.6) | CY 3346 (0.5) | SHP (0.1) | BK-411A (2.0) | | |
| 22 | Capron HPN9333G[16] | GP-298 (2.6) | CY 3346 (0.5) | SHP (0.1) | BK-411A (2.0) | | |
| 23 | Capron 8330 GHIHS[17] | GP-298 (2.6) | CY 3346 (0.5) | SHP (0.1) | BK-411A (2.0) | | |

TABLE 3-continued

| Sample | Nylon | Siloxane | HALS | Phosphorus Compound | Colorant | Anti-Oxidant | Other |
|---|---|---|---|---|---|---|---|
| 24 | Ube 3035C2[18] | GP-298 (2.6) | CY 3346 (0.5) | SHP (0.1) | BK-411A (2.0) | | |
| 25 | Ultramid A4[19] | GP-298 (2.6) | CY 3346 (0.5) | SHP (0.1) | BK-411A (2.0) | | |
| | Ultramid A5[20] | GP-298 (2.6) | CY 3346 (0.5) | SHP (0.1) | BK-411A (2.0) | | |
| | Zytel 101[21] | GP-298 (2.6) | CY 3346 (0.5) | SHP (0.1) | BK-411A (2.0) | | |
| | Zytel 42A[22] | GP-298 (2.6) | CY 3346 (0.5) | SHP (0.1) | BK-411A (2.0) | | |
| 26 | Nylon 6,10 | GP-298 (2.6) | CY 3346 (0.5) | SHP (0.1) | BK-411A (2.0) | | |
| 27 | Capron 8202 | GP-298 (2.6) | CY 3346 (0.5) | SHP (0.1) | 2GTM Yellow (2.0) | | |
| 28 | Capron 8233G | GP-298 (2.6) | CY 3346 (0.5) | SHP (0.1) | 2GTM Yellow (2.0) | | |
| 29 | Capron 8267G | GP-298 (2.6) | CY 3346 (0.5) | SHP (0.1) | 2GTM Yellow (2.0) | | |
| 30 | Capron 8351 | GP-298 (2.6) | CY 3346 (0.5) | SHP (0.1) | 2GTM Yellow (2.0) | | |
| 31 | Capron 8352 | GP-298 (2.6) | CY 3346 (0.5) | SHP (0.1) | 2GTM Yellow (2.0) | | |
| 32 | Capron HPN9233G | GP-298 (2.6) | CY 3346 (0.5) | SHP (0.1) | 2GTM Yellow (2.0) | | |
| 33 | Capron HPN9333G | GP-298 (2.6) | CY 3346 (0.5) | SHP (0.1) | 2GTM Yellow (2.0) | | |
| 34 | Capron 8330 GHIHS | GP-298 (2.6) | CY 3346 (0.5) | SHP (0.1) | 2GTM Yellow (2.0) | | |
| 35 | Ube 3035C2 | GP-298 (2.6) | CY 3346 (0.5) | SHP (0.1) | 2GTM Yellow (2.0) | | |
| 36 | Ultramid A4 | GP-298 (2.6) | CY 3346 (0.5) | SHP (0.1) | 2GTM Yellow (2.0) | | |
| 37 | Nylon 6,10 | GP-298 (2.6) | CY 3346 (0.5) | SHP (0.1) | 2GTM Yellow (2.0) | | |
| 38 | Capron 8202 | Dow 4-7051 (2.6) | CY 3346 (0.5) | SHP (0.1) | 2GTM Yellow (2.0) | | |
| 39 | Capron 8202 | GP-316 (2.6) | CY 3346 (0.5) | SHP (0.1) | 2GTM Yellow (2.0) | | |
| 40 | Capron 8202 | Dow-1 9641 (2.6) | CY 3346 (0.5) | SHP (0.1) | 2GTM Yellow (2.0) | | |
| 41 | Capron 8202 | Silox-1[23] | CY 3346 (0.5) | SHP (0.1) | 2GTM Yellow (2.0) | | |
| 42 | Capron 8202 | Silox-2[24] | CY 3346 (0.5) | SHP (0.1) | 2GTM Yellow (2.0) | | |
| 43 | Capron 8202 | Silox-3[25] | CY 3346 (0.5) | SHP (0.1) | 2GTM Yellow (2.0) | | |
| 44 | Capron 8202 | Silox-4[26] | CY 3346 (0.5) | SHP (0.1) | 2GTM Yellow (2.0) | | |
| 45 | Capron 8202 | Dow 4-7051 (2.6) | CY 3346 (0.5) | SHP (0.1) | BK-411A (2.0) | | |
| 46 | Capron 8202 | GP-316 (2.6) | CY 3346 (0.5) | SHP (0.1) | BK-411A (2.0) | | |
| 47 | Capron 8202 | Dow 1-9641 (2.6) | CY 3346 (0.5) | SHP (0.1) | BK-411A (2.0) | | |
| 48 | Capron 8202 | Silox-1 | CY 3346 (0.5) | SHP (0.1) | BK-411A (2.0) | | |

TABLE 3-continued

| Sample | Nylon | Siloxane | HALS | Phosphorus Compound | Colorant | Anti-Oxidant | Other |
|---|---|---|---|---|---|---|---|
| 49 | Capron 8202 | Silox-2 | CY 3346 (0.5) | SHP (0.1) | BK-411A (2.0) | | |
| 50 | Capron 8202 | Silox-3 | CY 3346 (0.5) | SHP (0.1) | BK-411A (2.0) | | |
| 51 | Capron 8202 | Silox-4 | CY 3346 (0.5) | SHP (0.1) | BK-411A (2.0) | | |
| 52 | Capron 8202 | GP-298 (2.6) | Tinuvin 770 (0.5) | SHP (0.1) | BK-411A (2.0) | | |
| 53 | Capron 8202 | GP-298 (2.6) | UV Check AM-806 (0.5) | SHP (0.1) | BK-411A (2.0) | | |
| 54 | Capron 8202 | GP-298 (2.6) | Tunivin 622 (0.5) | SHP (0.1) | BK-411A (2.0) | | |
| 55 | Capron 8202 | GP-298 (2.6) | Uvinul 5050 (0.5) | SHP (0.1) | BK-411A (2.0) | | CuI/KI (0.01) |
| 56 | Capron 8202 | GP-298 (2.6) | CY 3346 (0.5) | Irgaphos 12 (0.1) | BK-411A (2.0) | Irganox 1010 (0.1) | CuI/KI (0.01) |
| 57 | Capron 8202 | GP-298 (2.6) | CY 3346 (0.5) | Sandostab P-EPQ (0.1) | BK-411A (2.0) | | |
| 58 | Capron 8202 | GP-298 (2.6) | CY 3346 (0.5) | Irgaphos 168 (0.1) | BK-411A (2.0) | | |
| 59 | Capron 8202 | GP-298 (2.6) | CY 3346 (0.5) | Ethanox 398 (0.1) | BK-411a (2.0) | | |
| 60 | Capron 8202 | GP-298 (2.6) | CY 3346 (0.5) | SHP (0.1) | BK-411A (2.0) | Irganox 1010 (0.1) | |
| 61 | Capron 8202 | GP-298 (2.6) | CY 3346 (0.5) | SHP (0.1) | BK-411A (2.0) | Irganox 1098[27] (0.1) | |
| 62 | Capron 8202 | GP-298 (2.6) | CY 3346 (0.5) | SHP (0.1) | P.B. 15-4 (2.0) | Irganox 565[28] (0.1) | |
| 63 | Capron 8202 | GP-298 (2.6) | CY 3346 (0.5) | SHP (0.1) | P.G. #7 (2.0) | Irganox 1010 (0.1) | |
| 64 | Capron 8202 | GP-298 (2.6) | CY 3346 (0.5) | SHP (0.1) | Solvent Red 225 (2.0) | Irganox 1098 (0.1) | |
| 65 | Capron 8202 | GP-298 (2.6) | CY 3346 (0.5) | SHP (0.1) | 2GTM Yellow (2.0) | Irganox 565 (0.1) | |
| 66 | Capron 8202 | GP-298 (2.6) | CY 3346 (0.5) | SHP (0.1) | 2GTM Yellow (2.0) | (0.1) | CuI/KI |
| 67 | Capron 8202 | GP-298 (2.6) | CY 3346 (0.5) | SHP (0.1) | 2GTM Yellow (2.0) | | CuI/KI (0.01) |
| 68 | Capron 8202 | GP-298 (2.6) | CY 3346 (0.5) | SHP (0.1) | BK-411A (2.0) | | CuI/KI (0.01) |
| 69 | Capron 8202 | GP-298 (2.6) | CY 3346 (0.5) | SHP (0.1) | BK-411A (2.0) | Irganox 1010 (0.1) | CuI/KI (0.01) |
| 70 | Capron 8202 | GP-298 (2.6) | CY 3346 (0.5) | SHP (0.1) | BK-411A (2.0) | Irganox 1098 (0.1) | CuI/KI (0.01) |
| 71 | Capron 8202 | GP-298 (2.6) | CY 3346 (0.5) | SHP (0.1) | P.B. 15-4 (2.0) | Irganox 565 (0.1) | CuI/KI (0.01) |
| 72 | Capron 8202 | GP-298 (2.6) | CY 3346 (0.5) | SHP (0.1) | P.G. #7 (2.0) | Irganox 1010 (0.1) | CuI/KI (0.01) |
| 73 | Capron 8202 | GP-298 (2.6) | CY 3346 (0.5) | SHP (0.1) | Solvent Red 225 (2.0) | Irganox 1098 (0.1) | CuI/KI (0.01) |
| 74 | Capron 8202 | GP-298 (2.6) | CY 3346 (0.5) | SHP (0.1) | 2GTM Yellow (2.0) | Irganox 565 (0.1) | CuI/KI (0.01) |
| 75 | Capron 8202 | GP-298 (2.6) | CY 3346 (0.5) | SHP (0.1) | 2GTM Yellow (2.0) | | CuI/KI 1164 (0.5) |
| 76 | Capron 8202 | GP-298 (2.6) | CY 3346 (0.5) | SHP (0.1) | 2GTM Yellow | | Cyasorb 1164 (0.5) |
| 77 | Capron 8202 | GP-298 (2.6) | CY 3346 (0.5) | SHP (0.1) | BK-411A (2.0) | | Cyasorb 1164 (0.5) |
| 78 | Capron 8202 | GP-298 (2.6) | CY 3346 (0.5) | SHP (0.1) | BK-411A (2.0) | | Cyasorb 1164 (0.5) |
| 79 | Capron 8202 | GP-298 (2.6) | CY 3346 (0.5) | SHP (0.1) | BK-411A (2.0) | | Mixxim ® BB-100 (0.5)[29] |
| 80 | Capron 8202 | GP-298 (2.6) | CY 3346 (0.5) | SHP (0.1) | 2GTM Yellow (2.0) | | Mixxim ® BB-100 (0.5 |

TABLE 3-continued

| Sample | Nylon | Siloxane | HALS | Phosphorus Compound | Colorant | Anti-Oxidant | Other |
|---|---|---|---|---|---|---|---|
| 81 | Capron 8202 | GP-298 (2.6) | CY 3346 (0.5) | SHP (0.1) | P.B. 15-4 (2.0) | | Mixxim ® BB-100 (0.5 |
| 82 | Capron 8202 | GP-298 (2.6) | CY 3346 (0.5) | SHP (0.1) | P.G. #7 (2.0) | | Mixxim ® BB-100 (0.5 |
| 83 | Capron 8202 | GP-298 (2.6) | CY 3346 (0.5) | SHP (0.1) | Solvent Red 225 (2.0) | | |
| 84 | Capron 8202 | GP-298 (2.6) | CY 3346 (0.5) | SHP (0.1) | 2GTM Yellow (2.0) | | |
| 85 | Capron 8202 | GP-298 (2.6) | CY 3346 (0.5) | SHP (0.1) | P.B. 15-4 (2.0) | | |
| 86 | Capron 8202 | GP-298 (2.6) | CY 3346 (0.5) | SHP (0.1) | P.G. #7 (2.0) | | |
| 87 | Capron 8202 | GP-298 (2.6) | CY 3346 (0.5) | SHP (0.1) | Solvent Red 225 (2.0) | | |

[9]Capron 8202 nylon is a nylon 6 polymer with ultimate elongation of 70% (ASTM D-638), notched Izod of 1.0 ft.-lbs./in (ASTM D-256), a flexural modulus of 410,000 psi (ASTM D-790), and is white in color.
[10]Capron 8202HS nylon is a nylon 6 polymer with ultimate elongation of 70% (ASTM D-638), notched Izod of 1.0 ft.-lbs./in (ASTM D-256), a flexural modulus of 410,000 psi (ASTM D-790), a copper content of 50–150 PPM, and is pale yellow in color.
[11]Capron 8233G nylon is a 33% glass nylon 6 polymer with ultimate elongation of 3% (ASTM D-638), notched Izod of 1.2 ft.-lbs./in (ASTM D-256), and a flexural modulus of 1,110,000 psi (ASTM D-790).
[12]Capron 8267G nylon is a 40% glass and mineral filled nylon 6 polymer with ultimate elongation of 4% (ASTM D-638), notched Izod of 0.9 ft.-lbs./in (ASTM D-256), and a flexural modulus of 1,360,000 psi (ASTM D-790).
[13]Capron 8351 nylon is an impact modified nylon 6 polymer with ultimate elongation of 200% (ASTM D-638), notched Izod of no break (ASTM D-256), and a flexural modulus of 230,000 psi (ASTM D-790).
[14]Capron 8352 nylonis an impact modified nylon 6 polymer with ultimate elongation of 100% (ASTM D-638), notched Izod no break (ASTM D-256), and a flexural modulus of 280,000 psi (ASTM D-790).
[15]CapronHPN 9233G nylon is a 33% glass filled nylon 6 polymer with notched Izod of 2.4 ft.-lbs./in (ASTM D-256), and a flexural modulus of 1,360,000 psi (ASTM D-790).
[16]Capron HPN 9333G nylon is a 30% glass nylon 6 polymer with notched Izod of 4.0 ft.-lbs./in (ASTM D-256), and a flexural modulus of 1,120,000 psi (ASTM D-790).
[17]Capron 8333 GHIHS nylon is a high impact nylon 6 polymer with notched Izod of 4.0 ft.-lbs./in (ASTM D-256), and a flexural modulus of 490,000 psi (ASTM D-790).
[18]Ube 3035C2 nylon is a nylon 12 polymer.
[19]Ultramid A4 nylon is a nylon 6,6 material supplied by BASF with a formic acid viscosity of 93 and a melt flow index of 3.2 (ASTM D1238).
[20]Ultramid A5 nylon is a nylon 6,6 material supplied by BASF with a formic acid viscosity of 241 and a melt flow index of 0.5 (ASTM D1238)
[21]Zytel 101 nylon is a nylon 6,6 material supplied by DuPont with a formic acid viscosity of 50 and a melt flow index of 10.6 (ASTM D1238).
[22]Zytel 42A nylon is a nylon 6,6 material supplied by DuPont with a formic acid viscosity of 250 and a melt flow index of 0.5 (ASTM D1238).
[23]Silox-1 is a siloxane of structure [3] wherein R' is —$CH_3$, C is 400, D is 5, E is 5, and R is —$CO_2H$.
[24]Silox-2 is a siloxane of structure [3] wherein R' is —$CH_3$, C is 1500, D is 5, E is 5, and R is —$CO_2H$.
[25]Silox-3 is a siloxane of structure [3] wherein R' is —$CH_3$, C is 400, D is 5, E is 5, and R is —NCO.
[26]Silox-4 is a siloxane of structure [3] wherein R' is —$CH_3$, C is 1500, D is 5, E is 5, and R is —NCO.
[27]Irganox 1098 antioxidant {(N,N'-hexamethylene bis(3,5-di-t-butyl-4-hydroxyhydrocinnammamide)} is a product of Ciba-Geigy Company.
[28]Irganox 565 antioxidant {2,4-bis(n-octylthio)-6-(4-hydroxy-3,5-di-t-butylanilino)-1,3,5-triazine} is a product of Ciba-Geigy Company.
[29]Mixxix BB-100 benzotriazole {Bis{2-hydroxy-5-t-octyl-3-(benzotriazol-2-yl)Phenyl]-methane} is a product of Fairmont Chemicals of Newark, New Jersey.

Test plaques are molded from the compositions as described above. The samples 15–87 are found to leave a reduced amount of residue on mold surfaces during injection molding relative to samples produced using a non-reactive siloxane. This observation is made by noting the number of shots or parts molded before a reduction in surface quality is observed. Residue on the mold generally results in a reduction of surface quality and necessitates cleaning of the mold to restore the quality of the moldings. Samples 15–87 are found to exhibit diminished color shift ΔE(ASTM D-2244) and improved retention of surface integrity gloss, (ASTM 523) upon weathering to 1000 hours (1316 kJ/m$^2$) under SAE J-1960, relative to appropriate control samples. Thus, the compositions of the invention retain gloss and color upon weathering.

Example 4

Each of samples 15, 16, 24–27, and 34–87 are dry blended and extruded on a Haake TW-100 twin screw extruder equipped with conical feed screws and a mixing element. The polymer melt is maintained at 273° C. and the barrel sections are heated to 215°, 235°, and 240° C. respectively. The extruder screws are maintained at 50 RPM which results in a torque of approximately 1400. The polymer melt is formed into film using a 6" film die maintained at 240° C. with a die gap of 0.021" to give film with a nominal thickness of 0.0017 cm. The quality of the films is judged on % haze (ASTM DI 003), 20° gloss (ASTM D2457), a visual rating of dirt/gels, and yellowness index (YI, ASTM D1925, MacBeth CI-3100). The films are weathered to 100 hours using SAE J-1960. The resulting films exhibit gloss and haze similar to those of control samples. After weathering, these films have a ΔYI of less than 10.

Example 5

Each of samples 15, 16, 24–27, and 34–87 are dry blended on a twin screw extruder, with a melt temperature of 260° C. and a residence time of approximately one minute, into approximately ⅛" filament and pelletized after cooling using standard equipment. The compounded material is dried for 16 hours under vacuum at 160° C. This material is spun into fiber by extruding the polymer at a spinning temperature of 260° C. into 30 filaments having a total denier of 250.

The breaking strength retention (BSR) of these fibers is determined according to 49 CFR Ch. V (Oct. 1, 1986) Federal Motor Vehicle Standard No. 209. BSR values are the average of five measurements. The BSR of the fibers is determined after 112, 150, 225, and 450 $kJ/m^2$ doses in the SAE J1885 test. The compositions of this invention are found to give at least a 10% greater BSR than control samples.

We claim:

1. A composition comprising:
   (a) a polyamide;
   (b) a reactive siloxane,
   (c) a hindered amine; and
   (d) a phosphite or phosphonite.

2. The composition of claim 1 wherein said polyamide is selected from the group consisting of: —NH—$(CH_2)_n$—CO— and —NH$(CH_2)$n—NH—CO—$(CH_2)$m—CO— wherein n and m are integers selected from the group 4, 6, 9, 10, 11 and 12.

3. The composition of claim 2 wherein said polyamide is selected from the group consisting of: nylon-6, nylon-6,6, nylon-12, nylon 6, 10 and nylon-6,12.

4. The composition of claim 3 wherein said polyamide is selected from the group consisting of: nylon-6, and nylon-6,6.

5. The compositions of claim 4 wherein said polyamide, is selected from the group consisting of: a 40% glass and mineral filled nylon 6 polymer with an ultimate elongation of 4% (ASTM D-638), notched Izod of 0.9 ft.-lbs./in (ASTM D-256), and a flexural modulus of 1,110,000 psi (ASTM D-790); a 40% glass and mineral filled nylon 6 polymer with ultimate elongation of 4% (ASTM D-638). notched Izod of 0.9 ft.-lbs./in (ASTM D-256), a flexural modulus of 1,110,000 psi (ASTM D-790) and a copper content of 50–150 ppm. a 33% glass filled nylon 6 polymer with ultimate elongation of 3% (ASTM D-638), notched Izod of 1.2 ft.-lbs./in (ASTM D-256), a flexural modulus of 1,110,000 psi (ASTM D-790 and a copper content of 50–150 ppm; a 33% glass nylon 6 polymer with ultimate elongation of 3% (ASTM D-638), notched Izod of 1.2 ft.-lbs./in (ASTM D-256), and a flexural modulus of 1,110,000 psi (ASTM D-790); a nylon 6 polymer with ultimate elongation of 70% (ASTM D-638), notched Izod of 1.0 ft.-lbs./in (ASTM D-256). and a flexural modulus of 410,000 psi (ASTM D-790); an impact modified nylon 6 polymer with ultimate elongation of 200% (ASTM D-638), notched Izod of no break (ASTM D-256), and a flexural modulus of 230,000 psi (ASTM D-790); a 30% glass filled nylon 6 polymer that has a copper content of 50–150 ppm with a notched Izod of 4.0 ft.-lbs./in (ASTM D-256), and a flexural modulus of 1,120,000 psi (ASTM D-790); an impact modified nylon 6 polymer with ultimate elongation of 100% (ASTM D-638), notched Izod no break (ASTM D-256), and a flexural modulus of 280,000 psi (ASTM D-790).

6. The compositions of claim 4 wherein said polyamide is selected from the group consisting of: nylon 6,6 with a formic acid viscosity of 93 and a melt flow index of 3.2 (ASTM D1238); nylon 6,6 with a formic acid viscosity of 241 and a melt flow index of 0.5 (ASTM D1238); nylon 6,6 with a formic acid viscosity of 50 and a melt flow index of 10.6 (ASTM D1238); nylon 6,6 with a formic acid viscosity of 250 and a melt flow index of 0.5 (ASTM D 1238).

7. The compositions of claim 1 wherein said reactive siloxane has as a part of its structure a reactive epoxy group which is selected from the group consisting of:

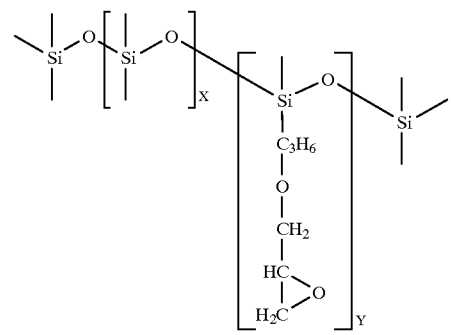

wherein X is from about 75 to about 2000 and Y is from about 1 to about 20;

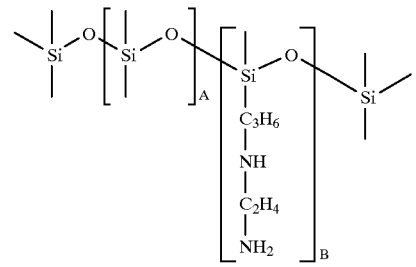

wherein A is from about 75 to about 2000 and B is from about 1 to about 20; or

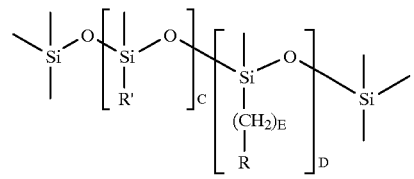

wherein C is from about 75 to about 2000, D and E are each from about 1 to about 20, R is selected from the group consisting of: amine, carboxylic acid, isocyanate, anhydride, and epoxy and R¹ is any substituted or unsubstituted: alkyl of from 1 to 25 carbon atoms, aryl and hetero aryl wherein when R¹ is substituted it may be substituted with a moiety selected from the group consisting of: cyano, alkoxy, halogen, partially or fully halogenated alkyl, or aryl, phenyl, substituted phenyl, alkyl, substituted alkyl, and silyl groups.

8. The compositions of claim 5 wherein said reactive siloxane is selected from the group consisting of:

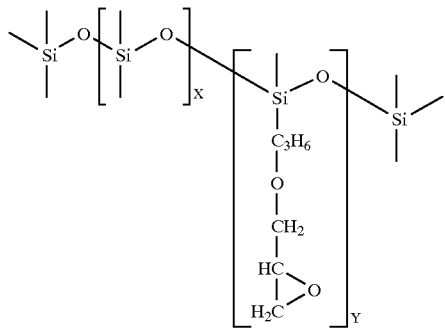

wherein X is from about 300 to about 1500 and Y is from about 5 to about 15;

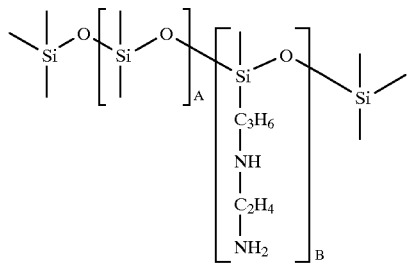

wherein A is from about 300 to about 1500 and B is from about 5 to about 15; and

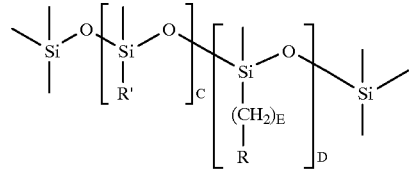

wherein C is from about 300 to about 1500, D is from about 5 to about 15, E is from about 3 to about 8, R¹ is selected from the group consisting of: straight chain and branched alkyl of from about 1 to 25 carbon atoms, phenyl, and phenyl substituted alkyl and R is selected from the group consisting of: isocyanate, amine, anhydride, carboxylic acid and epoxy.

9. The compositions of claim 5 wherein said reactive siloxane has a part of its structure a reactive epoxy group which is selected from the group consisting of:

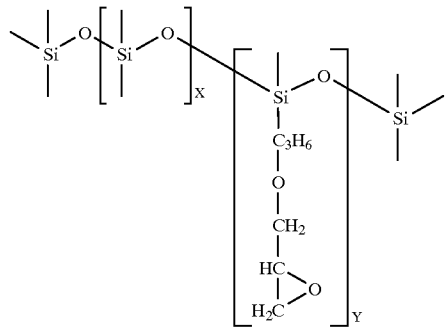

wherein X is from about 300 to about 1000 and Y is from about 5 to about 10; and

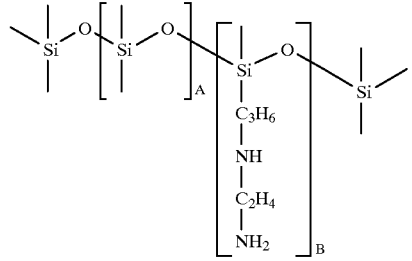

wherein A is from about 600 to about 1500 and B is from about 5 to about 10.

10. The compositions of claim 1 wherein said hindered amine is selected from the group consisting of: {N,N'''-[1,2-Ethanediylbis[[[4,6-bis[butyl(1,2,2,6,6-pentamethyl-4-piperidinyl)amino]-1,3,5-triazin-2-yl]imino]-3,1-propanediyl]]bis [N'N''-dibutyl-N',N''-bis(1,2,2,6,6-pentamethyl-4-piperidinyl)]-1,3,5-triazine-2,4-6-triamine}, {N,N''-bis(2,2,6,6-tetramethyl-4-piperidinyl)-1,6-hexanediamine, polymer with 2,4,6-trichloro-1,3,5-triazine and 2,4,4-trimethyl-1,2pentamine}, {Bis(1,2,2,6,6-pentamethyl-4-piperidinyl)(3,5-di-tert-butyl-4-hydroxyl) butylpropanedioate)}, {Dimethyl succinate polymer with 4-hydroxy-2,2,6,6-tetramethyl-1-piperidineethanol}, {Bis (1,2,2,6,6-pentamethyl-4-piperidinyl)sebacate}, {Bis(2,2,6, 6-Tetramethyl-4-piperidinyl)sebacate, {Poly [(6-morpholino-s-triazine-2,4-diyl)[2,2,6,6-Tetramethyl-4-piperidyl-imino]-hexamethlene [(2,2,6,6-tetramethyl-4-piperidyl-imino}, {2,2,6,6-Tetramethylpiperide-4yl-acrylate, methylmethacrylate copolymer},{Formamide, N,N'-1,6-hexanediylbis{N-(2,2,6,6-tetramethyl-4-piperidinyl)}, and a polymer of from about 3000 to about 4000 molecular weight having the structure:

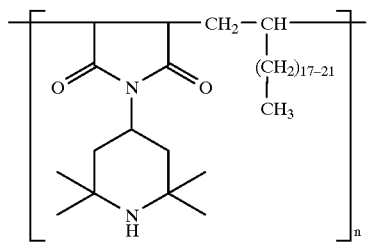

wherein n is from about 5 to about 9.

11. The compositions of claim 8 wherein said hindered amine is selected from the group consisting of: {Dimethyl succinate polymer with 4-hydroxy-2,2,6,6-tetramethyl-1-piperidineethanol}, {Bis(2,2,6,6-Tetramethyl-4-piperidinyl) sebacate}, {Poly[(6-morpholino-s-triazine-2,4-diyl)[2,2,6,6-Tetramethyl-4-piperidyl-imino]-hexamethiene [(2,2,6,6-tetramethyl-4-piperidyl-imino]]}, {2,2,6,6-Tetramethylpiperide-4yl-acrylate, methylmethacrylate), and a polymer of from about 3000 to about 4000 molecular weight having the structure:

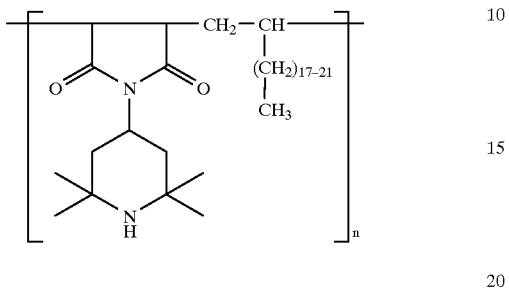

wherein n is from about 5 to about 9.

12. The composition of claim 1 wherein said phosphite or phosphonite is selected from the group consisting of: sodium hypophosphite, potassium hypophosphite, magnesium hypophosphite, calcium hypophosphite, ammonium hypophosphite, 2-[[2,4,8,10-Tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d.f][1,3,2]dioxaphosphepin-6-yl]oxy]-ethyl]ethanamine, Tris(2,4-di-tert-butylphenyl) phosphite, bis (2,4-di-tert-butylphenyl) pentaerythritol diphosphite, distearyl pentaerythritol diphosphite, tetrakis(2,4-di-tert-butylphenyl)4,4'-diphenylenediphosphonite, and 2,2'-ethilidinebis (4,6-di-tert-butyl-m-phenyl)fluorophosphonite.

13. The composition of claim 12 wherein said phosphite is an inorganic phosphite selected from the group consisting of: sodium hypophosphite, potassium hypophosphite, magnesium hypophosphite, calcium hypophosphite, and, ammonium hypophosphite.

14. The composition of claim 5 wherein said phosphite is an inorganic phosphite selected from the group consisting of: sodium hypophosphite, potassium hypophosphite, magnesium hypophosphite, calcium hypophosphite, and ammonium hypophosphite.

15. The composition of claim 5 wherein said phosphite is an organic phosphite selected from the group consisting of: 2-[[2,4,8,10-Tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d.f][1,3,2]dioxaphosphepin-6-yl]oxy]-ethyl]ethanamine, Tris(2,4-di-tert-butylphenyl) phosphite, bis (2,4-di-tert-butylphenyl) pentaerythritol diphosphite, and distearyl pentaerythritol diphosphite.

16. The composition of claim 5 wherein said phosphonite is selected from the group consisting of: tetrakis(2,4-di-tert-butylphenyl)4,4'-diphenylenediphosphonite, and 2,2'-ethilidinebis (4,6-di-tert-butyl-m-phenyl) fluorophosphonite.

17. The composition of claim 1 wherein said composition additionally comprises a colorant.

18. The composition of claim 17 wherein said colorant is carbon black.

19. The composition of claim 5 wherein said composition additionally contains a highly dispersed carbon black with an absorption coefficient as determined by ASTM D3349-74 of greater than 400 in a nylon or EVA carrier.

20. The composition of claim 19 wherein said carbon black is 42% carbon black in an EVA carrier with a melt index @190° C., 21.6 kg of 16–30 gms/10 min. (ASTM D1238) and has a pellet weight of 1.8–2.6g/100 pellets.

21. A composition comprising:
(a) polyamide selected from the group consisting of: —NH—(CH$_2$)n—CO— and —NH(CH$_2$)n—NH—CO—(CH$_2$)m—CO— wherein n and m are integers selected from the group 4, 6, 9, 10, 11 and 12;
(b) a reactive siloxane which has a part of its structure a reactive epoxy group which is selected from the group consisting of

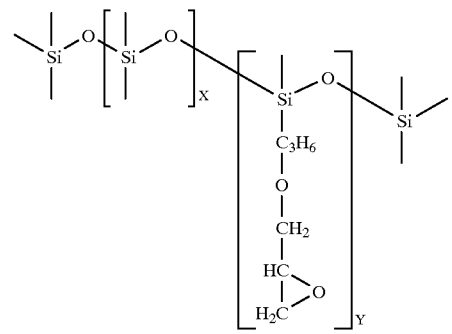

wherein X is from about 75 to about 2000 and Y is from about 1 to about 20;

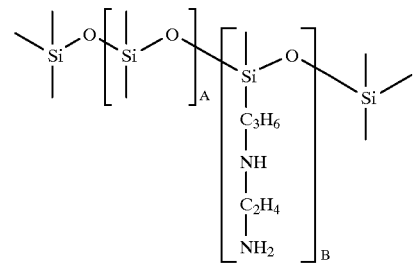

wherein A is from about 75 to about 2000 and B is from about 1 to about 20; and

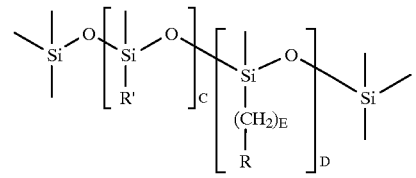

wherein C is from about 75 to about 2000, D and E are each between about 1 and about 20, R is selected from the group consisting of: amine, carboxylic acid, isocyanate, anhydride, and epoxy and R$^1$ is any substituted or unsubstituted: alkyl of from 1 to 25 carbon atoms, aryl, or hetero aryl wherein when R$^1$ is substituted it is substituted with a moiety selected from the group consisting of: cyano, alkoxy, halogen, partially or fully halogenated alkyl, or aryl, phenyl, substituted phenyl, alkyl, substituted alkyl, and silyl groups;
(c) a hindered amine selected from the group consisting of {N,N'''-[1,2-Ethanediylbis[[[4,6-bis[butyl(1,2,2,6,6-pentamethyl-4-piperidinyl)amino]-1,3,5-triazin-2-yl] imino]-3,1-propanediyl]]bis [N'N''-dibutyl-N',N''-bis (1,2,2,6,6-pentamethyl-4-piperidinyl)]-1,3,5-triazine-2

4-6-triamine}, (N,N"-bis(2,2,6,6-tetramethyl-4-piperidinyl)-1,6-hexanediamine, polymer with 2,4,6-trichloro-1,3,5-triazine and 2,4,4-trimethyl-1,2pentamine}, {Bis(1,2,2,6,6-pentamethyl-4-piperidinyl)(3,5-di-tert-butyl-4-hydroxyl)butylpropanedioate)}, {Dimethyl succinate polymer with 4-hydroxy-2,2,6,6-tetramethyl-1-piperidineethanol), {Bis(1,2,2,6,6-pentamethyl-4-piperidinyl)sebacate}, {Bis(2,2,6,6-Tetramethyl-4-piperidinyl)sebacate, {Poly[(6-morpholino-s-triazine-2,4-diyl)[2,2,6,6-Tetramethyl-4-piperidyl-imino]-hexamethlene [(2,2,6,6-tetramethyl-4-piperidyl-imino}, {2,2,6,6-Tetramethylpiperide-4yl-acrylate, methylmethacrylate copolymer},{Formamide, N,N'-1, 6-hexanediylbis{N-(2,2,6,6-tetramethyl-4-piperidinyl)}, and a polymer of from about 3000 to about 4000 molecular weight having the structure:

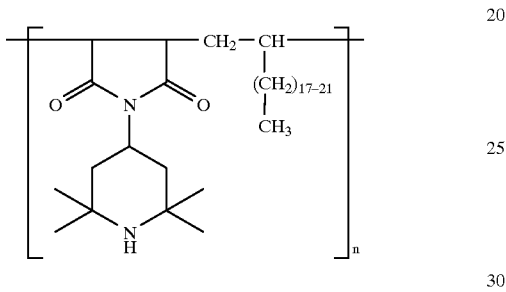

wherein n is from about 5 to about 9; and (d) a phosphite or phosphonite selected from the group consisting of: sodium hypophosphite, potassium hypophosphite, magnesium hypophosphite, calcium hypophosphite, ammonium hypophosphite, 2-[[2,4,8,10-Tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d.f][1,3,2]dioxaphosphepin-6-yl]oxy]-ethyl]ethanamine, Tris(2,4-di-tert-butylphenyl) phosphite, bis (2,4-di-tert-butylphenyl)pentaerythritol diphosphite, distearyl pentaerythritol diphosphite, tetrakis(2,4-di-tert-butylphenyl)4,4'-diphenylenediphosphonite, and 2,2'-ethilidinebis (4,6-di-tert-butyl-m-phenyl) fluorophosphonite.

22. The composition of claim 21 wherein said composition additionally comprises a colorant.

23. The composition of claim 22 wherein said colorant is a highly dispersed carbon black with an absorption coefficient as determined by ASTM D3349-74 of greater than 400 in a nylon or EVA carrier.

24. The composition of claim 23 wherein said carbon black is 42% carbon black in an EVA carrier with a melt index @190° C., 21.6 kg of 16–30 gms/10 min. (ASTM D1238) and a has pellet weight of 1.8–2.6g/100 pellets.

25. A composition comprising:

(a) a polyamide selected from the group consisting of: nylon-6, nylon-6,6, nylon-12, nylon 6,10 and nylon-6,12;

(b) a reactive siloxane selected from the group consisting of:

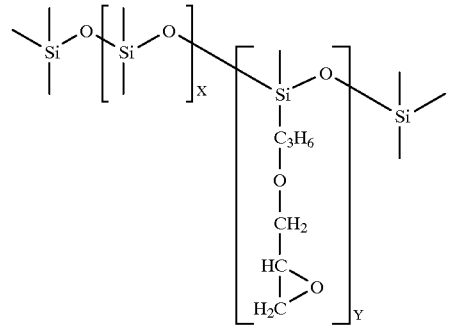

wherein X is from about 300 to about 1500 and Y is from about 5 to about 15;

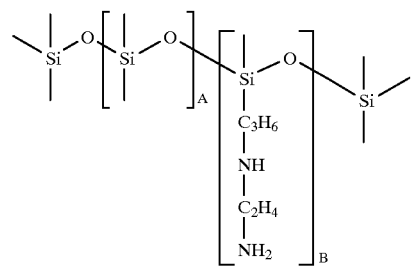

wherein A is from about 300 to about 1500 and B is from about 5 to about 15; and

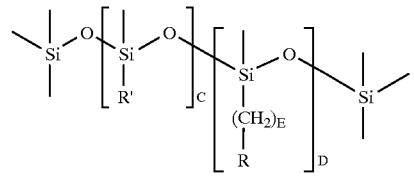

wherein C is from about 300 to about 1500, D is from about 5 to about 15, E is from about 3 to about 8, $R^1$ is selected from the group consisting of straight chain and branched alkyl of from about 1 to 25 carbon atoms, phenyl, and phenyl substituted alkyl and R is selected from the group consisting of: isocyanate, amine, anhydride, carboxylic acid and epoxy group;

(c) a hindered amine selected from the group consisting of: {N,N'''-[1,2-Ethanediylbis[[[4,6-bis[butyl(1,2,2,6,6-pentamethyl-4-piperidinyl)amino]-1,3,5-triazin-2-yl]imino]-3,1-propanediyl]]bis [N'N''-dibutyl-N',N''-bis (1,2,2,6,6-pentamethyl-4-piperidinyl)]-1,3,5-triazine-2,4-6-triamine}, {N,N''-bis(2,2,6,6-tetramethyl-4-piperidinyl)-1,6-hexanediamine, polymer with 2,4,6-trichloro-1,3,5-triazine and 2,4,4-trimethyl-1,2pentamine}, {Bis(1,2,2,6,6-pentamethyl-4-piperidinyl)(3,5-di-tert-butyl-4-hydroxyl)butylpropanedioate)}, {Dimethyl succinate polymer with 4-hydroxy-2,2,6,6-tetramethyl-1-piperidineethanol}, {Bis(1,2,2,6,6-pentamethyl-4-piperidinyl)sebacate}, {Bis(2,2,6,6-Tetramethyl-4-piperidinyl)sebacate, {Poly[(6-morpholino-s-triazine-2,4-diyl)[2,2,6,6-Tetramethyl-4-piperidyl-imino]-hexamethlene [(2,2,6,6-tetramethyl-4-piperidyl-imino}, {2,2,6,6-Tetramethylpiperide-4yl-acrylate, methylmethacrylate copolymer}, {Formamide, N,N'-1,6-hexanediylbis{N-(2,2,6,6-tetramethyl-4-piperidinyl)}, and a polymer of about 3000 to about 4000 molecular weight having the structure:

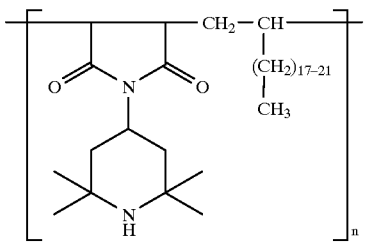

wherein n is from about 5 to about 9; and (d) a phosphite or phosphonite selected from the group consisting of sodium hypophosphite, potassium hypophosphite, calcium hypophosphite, ammonium hypophosphite, 2-[[2,4,8,10-Tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d.f][1,3,2]dioxaphosphepin-6-yl]oxy]-ethyl]ethanamine, Tris(2,4-di-tert-butylphenyl) phosphite, bis (2,4-di-tert-butylphenyl) pentaerythritol diphosphite, tetrakis( 2,4-di-tert-butylphenyl)4,4'-diphenylenediphosphonite, and 2,2'-ethilidinebis (4,6-di-tert-butyl-m-phenyl) fluorophosphonite.

26. The composition of claim 25 wherein said composition additionally comprises a colorant.

27. The composition of claim 26 wherein said colorant is a highly dispersed carbon black with an absorbtion coefficient as determined by ASTM D3349-74 of greater than 400 in a nylon or EVA carrier.

28. The composition of claim 27 wherein said carbon black is 42% carbon black in an EVA carrier with a melt index @190° C., 21.6 kg of 16–30 gms/10 min. (ASTM D1238) and has a pellet weight of 1.8–2.6 g/100 pellets.

29. A composition comprising:

(a) a polyamide selected from the group consisting of: nylon-6, and nylon-6,6;

(b) a reactive siloxane which has a part of its structure a reactive epoxy group which is selected from the group consisting of:

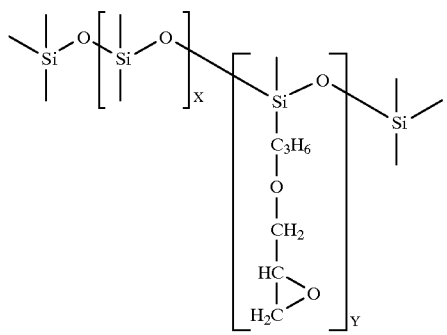

wherein X is from about 300 to about 1000 and Y is from about 5 to about 10, and

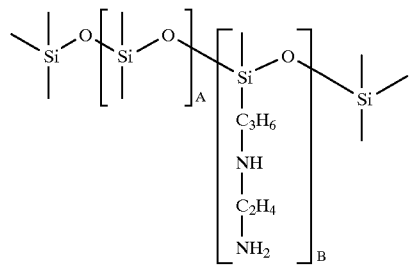

wherein A is from about 600 to about 1500 and B is from about 5 to about 10;

(c) a hindered amine selected from the group consisting of: {N,N"-bis(2,2,6,6-tetramethyl-4-piperidinyl)-1,6-hexanediamine, polymer with 2,4,6-trichloro-1,3,5-triazine and 2,4,4-trimethyl-1,2pentamine}, {(Bis(1,2,2,6,6-pentamethyl-4-piperidinyl)(3,5-di-tert-butyl-4 hydroxyl)butylpropanedioate)},{Dimethyl succinate polymer with 4-hydroxy-2,2,6,6-tetramethyl-1-piperidineethanol}, {Bis(2,2,6,6-Tetramethyl-4-piperidinyl)sebacate), {Poly[(6-morpholino-s-triazine-2,4-diyl)[2,2,6,6-Tetramethyl-4-piperidyl-imino]-hexamethlene [(2,2,6,6-tetramethyl-4-piperidyl-imino]]}, {(2,2,6,6-Tetramethylpiperide-4yl-acrylate, methylmethacrylate}, and a polymer of from about 3000 to about 4000 molecular weight having the structure:

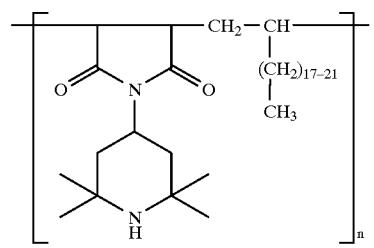

wherein n is from about 5 to about 9; and (d) a phosphite or phosphonite selected from the group consisting of: sodium hypophosphite, potassium hypophosphite, ammonium hypophosphite, calcium hypophosphite, 2-[[2,4,8,10-Tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d.f][1,3,2]dioxaphosphepin-6-yl]oxy]-ethyl]ethanamine, Tris(2,4-di-tert-butylphenyl) phosphite, bis (2,4-di-tert-butylphenyl) pentaerythritol diphosphite, distearyl pentaerythritol diphosphite, tetrakis(2,4-di-tert-butylphenyl)4,4'-diphenylenediphosphonite, and 2,2'-ethilidinebis (4,6-di-tert-butyl-m-phenyl) fluorophosphonite.

30. The composition of claim 29 wherein said composition additionally comprises a colorant.

31. The composition of claim 30 wherein said colorant is a highly dispersed carbon black with an absorption coefficient as determined by ASTM D3349-74 of greater than 400 in a nylon or EVA carrier.

32. The composition of claim 31 wherein said carbon black is 42% carbon black in an EVA carrier with a melt index @190° C. 21.6 kg of 16–30 gms/10 min. (ASTM D1238) and has a pellet weight of 1.8–2.6 g/100 pellets.

33. A composition comprising:
(a) a polyamide selected from the group consisting of: a 40% glass and mineral filled nylon 6 polymer that has a copper content of 50–150 ppm with ultimate elongation of 4% (ASTM D-638), notched Izod of 0.9 ft.-lbs./in (ASTM D-256), and a flexural modulus of 1,110,000 psi (ASTM D-790); a 40% glass and mineral filled nylon 6 polymer with ultimate elongation of 4% (ASTM D-638), notched Izod of 0.9 ft.-lbs./in (ASTM D-256), and a flexural modulus of 1,110,000 psi (ASTM D-790); a 33% glass filled nylon 6 polymer that has a copper content of 50–150 ppm with an ultimate elongation of 3% (ASTM D-638), notched Izod of 1.2 ft.-lbs./in (ASTM D-256), and a flexural modulus of 1,110,000 psi (ASTM D-790); a 33% glass filled nylon 6 polymer with an ultimate elongation of 3% (ASTM D-638), notched Izod of 1.2 ft.-lbs./in (ASTM D-256), and a flexural modulus of 1,110,000 psi (ASTM D-790); a nylon 6 polymer with an ultimate elongation of 70% (ASTM D-638), notched Izod of 1.0 ft.-lbs./in (ASTM D-256), and a flexural modulus of (ASTM D-638), notched Izod of 1.0 ft.-lbs./in (ASTM D-256), and a flexural modulus of 410,000 psi (ASTM D-790); an impact modified nylon 6 polymer with ultimate elongation of 200% (ASTM D-638), notched Izod of no break (ASTM D-256), and a flexural modulus of 230,000 psi (ASTM D-790); a 30% glass filled nylon 6 polymer that has a copper content of 50–150 ppm with notched Izod of 4.0 ft.-lbs./in (ASTM D-256), and a flexural modulus of 1,120,000 psi (ASTM D-790); an impact modified nylon 6 polymer with an ultimate elongation of 100% (ASTM D-638), notched Izod no break (ASTM D-256), and a flexural modulus of 280,000 psi (ASTM D-790);
(b) a reactive siloxane which has a part of its structure a reactive epoxy group of the following structure:

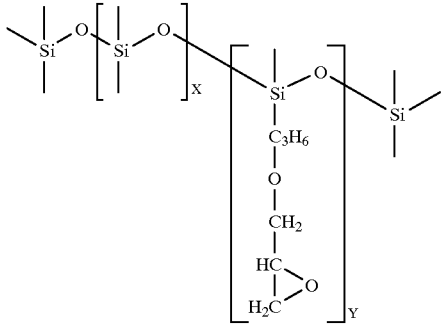

wherein X is 670 and Y is 6;
(c) {Poly[(6-morpholino-s-triazine-2,4-diyl)[2,2,6,6-Tetramethyl-4-piperidyl-imino]-hexamethylene [(2,2,6,6-tetramethyl-4-piperidyl-imino]]}; and
(d) sodium hypophosphite.

34. The composition of claim 33 wherein said composition additionally comprises a colorant.

35. The composition of claim 34 wherein said colorant is a highly dispersed carbon black with an absorption coefficient as determined by ASTM D3349-74 of greater than 400 in a nylon or EVA carrier.

36. The composition of claim 35 wherein said carbon black is 42% carbon black in an EVA carrier with a melt index @190° C., 21.6 kg of 16–30 gms/10 min. (ASTM D1238) and has a pellet weight of 1.8–2.6 g/100 pellets.

37. The composition of claim 1 wherein said hindered amine component does not include hindered amines which are bonded to siloxanes.

38. The composition of claim 1 where said polyamide is present in an amount of from about 50 wt. % to about 98 wt. %.

39. The composition of claim 1 where said reactive siloxane is present in an amount of from about 0.5 wt. % to about 10 wt. %.

40. The composition of claim 1 where said hindered amine is present in an amount of from about 0.1 wt. % to about 4 wt. %.

41. The composition of claim 1 where said phosphite or phosphonite is present in an amount of from about 0.05 wt. % to about 2 wt. %.

42. A fiber comprising a composition of claim 1.

43. A molded plastic part comprising a composition of claim 1.

44. A plastic film comprising a composition of claim 1.

45. A plastic coating comprising a composition of claim 1.

46. The fiber of claim 42 wherein said fiber is a carpet fiber.

47. The fiber of claim 42 wherein said fiber is a seatbelt fiber.

48. A composition comprising:
(a) a polyamide selected from the group consisting of: —NH—(CH$_2$)n—CO— and NH(CH$_2$)n—NH—CO—(CH$_2$)m—CO— wherein n is an integer selected from the group 6, 9, 10, 11, and 12 and m is an integer selected from the group 4, 6, 9, 10, 11, and 12;
(b) a reactive siloxane;
(c) a hindered amine; and
(d) a phosphite or phosphonite.

49. A composition comprising:
(a) a polyamide selected from the group consisting of: —NH—(CH$_2$)n—CO— and NH(CH$_2$)n—NH—CO—(CH$_2$)m—CO— wherein n is the integer 4 and m is an integer selected from the group 4, 9, 10, 11, and 12;
(b) a reactive siloxane;
(c) a hindered amine; and
(d) a phosphite or phosphonite.

* * * * *